(12) United States Patent
Flach et al.

(10) Patent No.: US 11,592,132 B2
(45) Date of Patent: Feb. 28, 2023

(54) FLUID COUPLING WITH TOLERANCE COMPENSATION FOR THE FLEXIBLE CONNECTION OF TWO MEDIA-CONDUCTING ELEMENTS

(71) Applicant: ContiTech MGW GmbH, Hannoversch Muenden (DE)

(72) Inventors: Axel Flach, Bad Wildungen (DE); Harald Kreidner, Hannoversch Muenden (DE); Klaus-Alexander Siegel, Northeim (DE)

(73) Assignee: ContiTech MGW GmbH, Hann. Münden (DE)

( * ) Notice: Subject to any disclaimer, the term of this patent is extended or adjusted under 35 U.S.C. 154(b) by 740 days.

(21) Appl. No.: 16/503,530

(22) Filed: Jul. 4, 2019

(65) Prior Publication Data
US 2020/0032939 A1    Jan. 30, 2020

(30) Foreign Application Priority Data
Jul. 25, 2018   (DE) ...................... 10 2018 212 376.4

(51) Int. Cl.
*F16L 37/098*   (2006.01)
*F16L 37/10*    (2006.01)
*F16L 37/24*    (2006.01)
*F16D 71/04*    (2006.01)

(52) U.S. Cl.
CPC ............. *F16L 37/098* (2013.01); *F16L 37/10* (2013.01); *F16L 37/24* (2013.01); *F16D 71/04* (2013.01)

(58) Field of Classification Search
CPC ......... F16L 37/098; F16L 37/10; F16L 37/24; F16L 37/096; F16L 37/0982; F16L 37/0985; F16D 71/04
See application file for complete search history.

(56) References Cited

U.S. PATENT DOCUMENTS

| 2,755,106 | A | * | 7/1956 | Chisholm | F16L 37/0982 285/7 |
|---|---|---|---|---|---|
| 4,589,684 | A | * | 5/1986 | Nowacki | F16L 37/098 285/319 |
| 5,078,429 | A | * | 1/1992 | Braut | F16L 37/098 285/4 |
| 8,764,066 | B1 | | 7/2014 | Rice et al. | |
| 2013/0320672 | A1 | | 12/2013 | Steele | |
| 2017/0152979 | A1 | | 6/2017 | Klein et al. | |

FOREIGN PATENT DOCUMENTS

| CN | 103453256 A | 12/2013 | | |
|---|---|---|---|---|
| DE | 102007032027 A1 | * | 2/2009 | ............ F16L 37/098 |
| DE | 102010004053 A1 | * | 7/2011 | ............ F16L 37/096 |

(Continued)

*Primary Examiner* — Matthew Troutman
*Assistant Examiner* — Fannie C Kee

(57) ABSTRACT

The invention relates to a fluid coupling (1) with tolerance compensation for the flexible connection of two media-conducting elements. The invention was based on the object of improving a fluid coupling (1) of the described type in such a manner that the use of complicated latching systems for transport can be omitted. This object is achieved in that the fluid coupling (1) has at least one transport securing device (8, 12), by means of which a separation of the components (2, 3) of the fluid coupling (1) from one another prior to installation can be prevented.

3 Claims, 1 Drawing Sheet

(56) References Cited

FOREIGN PATENT DOCUMENTS

| DE | 102014107655 A1 | | 12/2015 | |
|---|---|---|---|---|
| DE | 102014211844 A1 | | 12/2015 | |
| DE | 102017212907 A1 | * | 1/2019 | ............. F16L 37/24 |
| EP | 0325806 A1 | | 8/1989 | |
| EP | 0347279 A1 | * | 12/1989 | ............ F16L 37/098 |
| EP | 2957809 B1 | * | 6/2019 | ............ F16L 37/098 |
| FR | 1365469 A | * | 7/1964 | ............. F16L 37/24 |
| JP | 2006105201 A | | 4/2006 | |

* cited by examiner

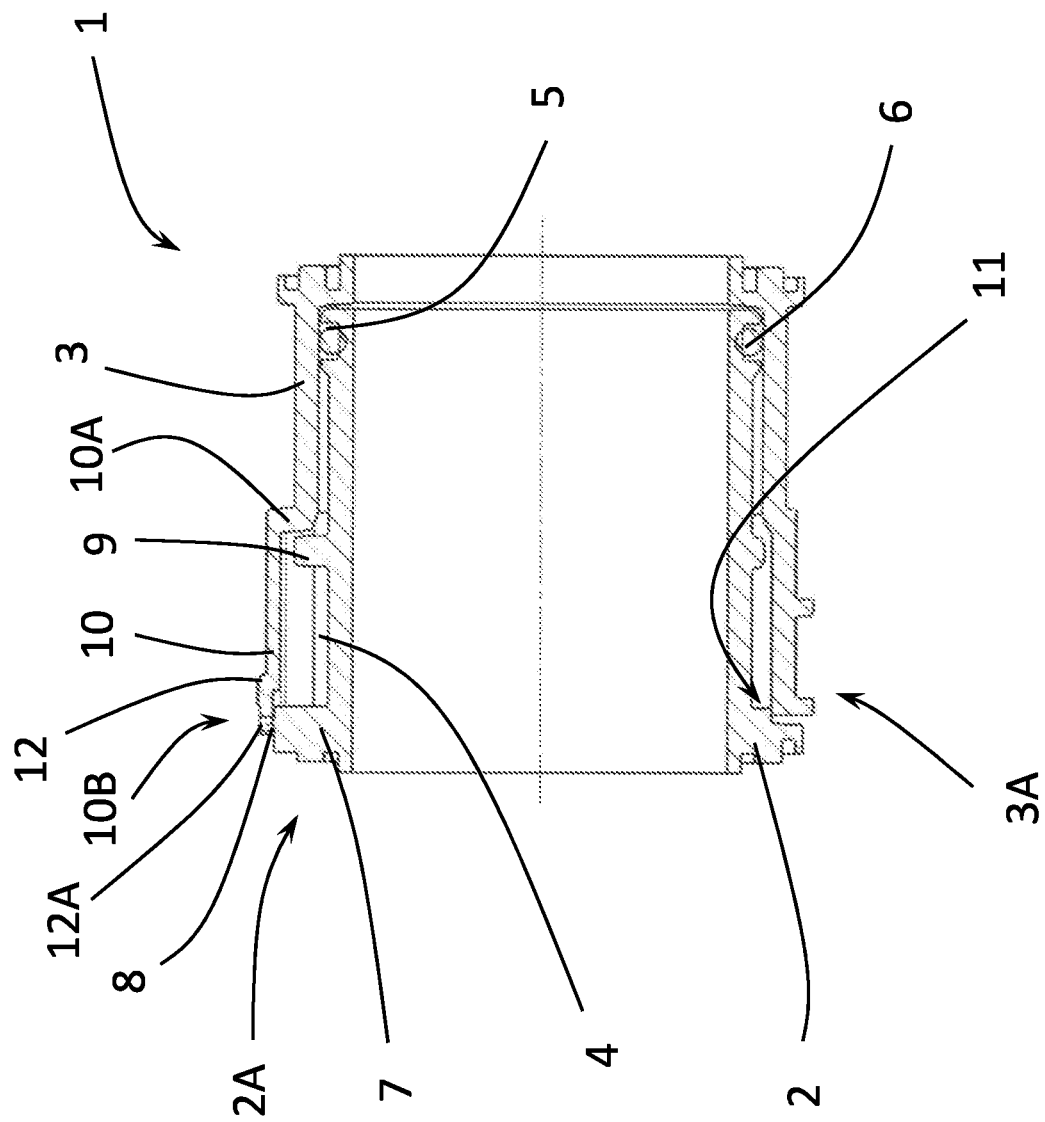

FLUID COUPLING WITH TOLERANCE COMPENSATION FOR THE FLEXIBLE CONNECTION OF TWO MEDIA-CONDUCTING ELEMENTS

BRIEF SUMMARY

The invention relates to a fluid coupling with tolerance compensation for the flexible connection of two media-conducting elements, having a first component for connection to the first fluid-conducting element, and a second component for connection to the second fluid-conducting element, the first component and the second component being displaceable in a translational manner with respect to each other in the direction of the common longitudinal direction, and/or the first component and the second component being rotatable in a rotational manner with respect to each other about the common longitudinal direction, and/or the first component and the second component being tiltable cardanically with respect to each other perpendicularly to the common longitudinal direction.

In order to transport media, such as, for example, fluids, gases or else pasty media, use is made of, for example, lines, hoses, pipes, etc. These can be attached to one another or, for example, to assemblies in order to realize the flow of media. For example, in the automobile sector, fluids, such as, for example, fuels, oils, additional substances (AdBlue®) and coolants or gases, such as, for example, charge air are conducted in such a manner.

Couplings are used in order to produce this connection or this attachment. Said couplings serve for the secure, permanent and media-tight connection of the elements.

On account of the manufacturing, the course of said lines is afflicted with tolerances of a greater or lesser size, which may be permissible depending on the application, for example the installation space in the vehicle. Use can therefore be made of lines which lie within the smallest and largest sizes of the tolerances of the application.

Depending on the application, the size of the tolerances is determined such that the course of the line is not impaired by the permissible tolerances, for example by collision with neighboring components. The insertability of the line also has to be kept within the permissible tolerances so that said line corresponds to the screw-on positions, e.g. between engine and secondary assemblies.

DE 10 2014 211 844 A1 discloses a coupling element of the type in question which has a latching connection for the captive connection. The latching is based here on latching elements which can be snapped into place. Said latching elements have to have a certain elasticity with a simultaneously high strength so that they do not break as they are being snapped into place. For this purpose, relatively high-quality materials are necessary, for example glass fiber reinforced PA 6.6, which leads to considerable costs since the entire coupling element is produced from this material although a corresponding elasticity with a high strength is necessary only for the latching elements.

Frequently, however, in the operating position, the two components of the coupling are no longer separable from each other because of the installation position once the line is installed because, for example, the axial movability of the coupling that is necessary for pulling the coupling parts apart is no longer provided because of the fixed screwing of the line parts onto engine and secondary assembly. The above-described latching elements are therefore often not necessary during the operation of the line, and therefore a high outlay is expended here that may be superfluous for the operation of the fluid coupling.

The invention was therefore based on the object of improving a tolerance-compensating coupling element of the type described at the beginning in such a manner that the use of complicated latching systems can be omitted.

This object is achieved in that the fluid coupling has at least one transport securing device, by means of which a separation of the components of the fluid coupling from one another prior to installation can be prevented.

Such transport securing can be configured in a simple manner and is necessary only until the components of the fluid coupling are installed. The requirements imposed on the thermal load-bearing capacity are therefore very low. It is therefore possible to dispense with expensive materials for latching even during operation.

It is indeed possible during the transport for the movability of the components of the fluid coupling to be significantly restricted or entirely prevented in a translational or rotational manner with respect to one another in the direction of the common longitudinal direction or cardanically with respect to one another perpendicularly to the common longitudinal direction by such transport securing. However, this movability is a requirement which applies only to the operation.

In a development of the invention, one of the components of the fluid coupling has at least one axially projecting cantilever arm and the other of the two components of the fluid coupling has at least one radially projecting latching lug, wherein cantilever arm and latching lug correspond in a transport position of the fluid coupling in such a manner that at least one cantilever arm protrudes over at least one latching lug and the latching lug projects to such a radially far extent that clamping contact can be achieved between the cantilever arm and the latching lug.

Since, in the transport position of the two components, a translational, rotational or cardanic movability of the components with respect to one another is not required, the two components of the fluid coupling can be pushed together until the cantilever arm comes to lie over the latching lug. Clamping can be achieved here between the latching lug and the cantilever arm, said clamping being sufficient to prevent the components from falling out of one another during transport, with easy fittability nevertheless being provided.

Since the clamping force does not have to be very high, the material of the components is not loaded beyond the optionally small elastic portion, and therefore breaking of the cantilever arm can be avoided.

The use of particularly high-strength materials for the fluid coupling can thereby be avoided.

In a development of the invention, the cantilever arm has a radial bore which, in the transport position, is assigned to the latching lug and corresponds thereto.

Such a bore can easily be produced, for example, from plastic in the case of injection molded parts and acts virtually as an undercut, and therefore, in the transport position, the clamping connection between cantilever arm and latching lug additionally has a form-fitting portion. This increases the security against the components falling out of one another during transport.

In a development of the invention, the two components of the fluid coupling have a guide device which is effective between the first component and the second component of the fluid coupling only in the transport position of the two components.

A guide device of this type can be constructed, for example in the case of tubular components, from a step on the first component with an associated bore of the second component, wherein the axial extent is dimensioned in such a manner that engagement of the step in the bore is possible only when the components are pushed together. The clamping of the components can thereby be achieved in a particularly simple manner since a corresponding position between cantilever arm and latching lug is facilitated by the guide as they are being pushed together.

BRIEF DESCRIPTION OF THE SEVERAL VIEWS OF THE DRAWING(S)

FIG. 1 shows a longitudinal section through a fluid coupling.

DETAILED DESCRIPTION

An example of the invention is explained in more detail below on the basis of the drawing. FIG. 1 shows a longitudinal section through a fluid coupling 1 according to the invention, wherein the fluid coupling is in its transport position. The fluid coupling 1 has an inner part 2 and an outer part 3 which of tubular construction, wherein the inner part 2 can be pushed into the outer part 3. Inner part 2 and outer part 3 are spaced apart over a predetermined axial length by an annular gap 4. In the fitted state, the gap 4 provides for rotational, translational and cardanic movability of the inner part 2 in relation to the outer part 3. In addition, the inner part 2 has an annular groove 5 in which an O ring seal 6 is arranged. During the operation, the O ring seal provides for fluid-tight sealing of inner part 2 in relation to the outer part 3.

The inner part 2 has a radial end collar 7 at its first end 2A. Radially outwardly pointing latching lugs, of which only one latching lug 8 is shown here, are arranged at predetermined points on the radial end collar 7. In addition, the inner part 2 has a further supporting collar 9 spaced apart axially from the end collar 7. The supporting collar 9 serves for restricting the cardanic movability of inner part 2 and outer part 3 during the operation.

At its first end 3A, the outer part 3 has a sleeve-shaped axial region 10 which, in the state shown of the fluid coupling 1, partially protrudes over the radial end collar 7 of the inner part 2. The sleeve-shaped region 10 has a step 10A which, in the state shown, strikes axially against the supporting collar 9 of the inner part 2. At its first end 10B, the sleeve-shaped region 10 has a guide region 11 which reaches axially over the end collar 7 of the inner part with a small radial clearance (not visible here), and thus guides the outer part 3 and the inner part 2 radially in relation to each other, wherein said interaction is effective only in the transport position shown of the fluid coupling 1.

At its first end 10B, the sleeve-shaped region 10 has an axially projecting cantilever arm 12 which, in the position shown, protrudes in a radially clamping manner over the latching lug 8. The cantilever arm 12 has a bore 12A which corresponds to the latching lug 8, wherein the latching lug 8 projects radially into the bore 12A. As a result, a clamping connection with a form-fitting portion exists between the latching lug 8 and the cantilever arm 12.

In order to mount the fluid coupling 1 on fluid-conducting components (not shown here), inner part 2 and outer part 3 can be pulled apart axially from each other, wherein force has to be applied in order to release the clamping and latching connection between the cantilever arm 12 and the latching lug 8.

With this arrangement, the fluid coupling 1 is secured against the outer part 3 unintentionally falling out of the inner part 2 during transport and can nevertheless be provided with an acceptable force to be applied by the worker for the mounting.

LIST OF REFERENCE DESIGNATIONS (Part of the Description)
1 fluid coupling
2 inner part
2A first end of the inner part 2
3 outer part
3A first end of the outer part 3
4 gap between inner part 2 and outer part 3
5 annular groove in the inner part 2
6 O ring seal
7 end collar of the inner part 2
8 latching lug
9 supporting collar
10 sleeve-shaped region of the outer part 3
10A step of the sleeve-shaped region 10
10B first end of the sleeve-shaped region 10
11 guide region of the sleeve-shaped region 10
12 cantilever arm
12A bore of the cantilever arm 12

The invention claimed is:

1. A fluid coupling comprising:
an inner part having an annular groove proximate a first end, a support collar and a latching lug proximate a second end;
an outer part having a first end proximate the first end of the inner part, a sleeve shaped region, and a cantilever arm proximate a second end;
the cantilever arm configured to protrude in a radially clamping manner over the latching lug of the inner part and comprising a bore into which the latching lug projects;
the inner part and the outer part rotatable in a rotational manner with respect to each other about a common longitudinal direction; and
the sleeve-shaped region having a step that strikes axially against the support collar of the inner part.

2. The fluid coupling of claim 1, wherein a clamping connection between the cantilever arm and the latching lug maintains connection of the inner part to the outer part in a connected state.

3. The fluid coupling of claim 2, wherein the clamping connection is configured to be broken by application of a force to release the clamping and latching connection between the cantilever arm and the latching lug to transition to a disconnected state.

* * * * *